US006926201B2

(12) United States Patent
Numata

(10) Patent No.: US 6,926,201 B2
(45) Date of Patent: Aug. 9, 2005

(54) BANK NOTE PROCESSING MACHINE

(75) Inventor: Toshio Numata, Hiroshima (JP)

(73) Assignee: Glory LTD (JP)

(*) Notice: Subject to any disclaimer, the term of this patent is extended or adjusted under 35 U.S.C. 154(b) by 0 days.

(21) Appl. No.: 10/671,318

(22) Filed: Sep. 25, 2003

(65) Prior Publication Data

US 2004/0125358 A1 Jul. 1, 2004

Related U.S. Application Data

(62) Division of application No. 09/872,223, filed on Jun. 1, 2001, now Pat. No. 6,734,953.

(30) Foreign Application Priority Data

Jun. 12, 2000 (JP) ....................................... 2000-175173

(51) Int. Cl.[7] ................................................ G06F 17/60

(52) U.S. Cl. ....................... 235/379; 235/380; 235/435; 235/436; 356/71

(58) Field of Search ................................ 235/379, 380, 235/13–17, 435, 436; 382/112, 135; 356/71; 283/72

(56) References Cited

U.S. PATENT DOCUMENTS 5,021,639 A * 6/1991 Hara et al. .................. 235/379
5,186,334 A * 2/1993 Fukudome et al. ......... 209/534
5,483,363 A * 1/1996 Holmes et al. ................ 359/2
5,923,413 A * 7/1999 Laskowski ................... 356/71
6,094,500 A * 7/2000 Ross et al. .................. 382/135
6,172,745 B1 * 1/2001 Voser et al. .................. 356/71
6,381,354 B1 * 4/2002 Mennie et al. .............. 382/135
6,734,953 B2 * 5/2004 Numata ....................... 356/71

* cited by examiner

*Primary Examiner*—Steven S. Paik
(74) *Attorney, Agent, or Firm*—TraskBritt

(57) ABSTRACT

There is provided a bank note processing machine in which a discrimination sensor can be formed compactly even when bank notes are discriminated using a light source having a plurality of wavelengths and in which the bank note transport path is shortened to achieve compactness. A bank note processing machine in which bank notes placed on an insert tray are sequentially delivered one by one to be fed to a discrimination sensor section; the bank note types and the genuineness or falsehood of bank notes are discriminated based on signals detected by a discrimination sensor at the discrimination sensor section; and the discriminated bank notes are sent to an accumulating section, wherein the discrimination sensor is formed by a light projecting section for irradiating over a slit area substantially the entire passing width of the bank notes and a light receiving section constituted by a photodiode array; the light projecting section is formed by a light guide plate and at least one LED provided on a side of the light guide plate; and the light projecting section and light receiving section are provided in a face-to-face relationship with the transport path of the bank notes sandwiched therebetween or provided in parallel on one the of the transport path.

14 Claims, 9 Drawing Sheets

BANK NOTE PROCESSING MACHINE

This is a divisional application of U.S. application Ser. No. 09/872,223 filed 1 Jun. 2001 U.S. Pat. No. 6,734,953, which is presently pending.

BACKGROUND OF THE INVENTION

1. Field of the Invention

The present invention relates to a bank note processing machine having a function of discriminating the bank note types and the genuineness/falsehood of bank notes, and more particularly to a compact bank note processing machine in which a compact discrimination sensor for irradiating bank notes with light having a plurality of wavelengths in the form of slits is provided such that the entire region of bank notes transported therethrough can be scanned to discriminate the bank note types and genuineness/falsehood of the bank notes based on light transmitted or reflected by the bank notes.

2. Description of the Prior Art

Various bank note processing machines (bank note discriminators) having a discriminating function for discriminating the bank note types and genuineness/falsehood of bank notes have been proposed including, for example, that disclosed in Japanese Patent Application Laid-open No. 312480/1998.

In the bank note processing machine disclosed in the above-cited publication, as shown in FIG. 1, a red LED array 102*a* and an infrared LED (Light Emitting Diode) array 102*b* are disposed in parallel to form a light source on one side of a transport path of a bank note 100, and a linear image sensor as a light receiving section 101 is formed on the other side opposite thereto to sandwich the same path. The red LED array 102*a* and infrared LED array 102*b* have a length that is substantially equal to the width of the bank note 100 passing by them. The output of the light receiving section 101 is inputted to a bank note genuineness/falsehood discrimination process section 104 to discriminate the genuineness/falsehood of the bank note 100. The reason for the use of the light source having a plurality of wavelengths is that there is a difference between the wavelengths of beams of light transmitted by a genuine bank note and a counterfeit bank note that is a color copy and the genuineness/falsehood can be determined based on the a difference between ratios of transmittance.

In the above-described conventional bank note processing machine, since the plurality of LED arrays 102*a* and 102*b* are disposed in parallel to form a discrimination sensor, the dimension of the light source section of the discrimination sensor inevitably becomes great in the direction in which bank notes are transported. As a result, it is necessary to provide the bank note transport path with a great dimension, which has resulted in a problem in that effort to make the bank note processing machine more compact is hindered. It is considered desirable to discriminate bank notes using a light source having many wavelengths from the viewpoint of improvement of accuracy of discrimination of the bank notes. For example, let us assume that a discrimination sensor is configured by disposing an array of LEDs in four rows having different wavelengths in parallel in order to perform discrimination with a light source having four wavelengths. Then, the sensor occupies considerably large dimensions. The sensor size (length) is increased further when a sensor having a light source with five wavelengths is used.

SUMMARY OF THE INVENTION

The present invention has been made in view of the above-described situation, and it is an object of the present invention to provide a bank note processing machine in which a discrimination sensor can be formed with a compact size even when bank notes are discriminated using a light source having a plurality of wavelengths and in which a bank note transport path is made short to achieve compactness.

The present invention relates to a bank note processing machine in which bank notes placed on a insert tray are sequentially delivered one by one to be fed to a discrimination sensor section; the bank note types and the genuineness/falsehood of said bank notes are discriminated based on signals detected by a discrimination sensor at said discrimination sensor section; and said discriminated bank notes are sent to an accumulating section, and the above-described object of the present invention is achieved by forming said discrimination sensor with a light projecting section for irradiating the substantially entire passing width of said bank notes in the form of slits and a light receiving section constituted by a photodiode array, forming said light projecting section with a light guide plate and at least one LED provided on a side of said light guide plate and providing said light projecting section and light receiving section in a face-to-face relationship with a transport path of said bank notes sandwiched therebetween or providing them in parallel on one side of said transport path.

Further, the above-described object is achieved by: forming said discrimination sensor with a light projecting section for irradiating over a slit area substantially the entire passing width of said bank notes and a light receiving section constituted by a photodiode array, forming said light projecting section with a light guide plate and an infrared light LED, a red light LED, a green light LED, and a blue light LED provided on a side of said light guide plate, and providing said light projecting section and light receiving section in a face-to-face relationship with a transport path of said bank notes sandwiched therebetween; or disposing a pair of light projecting and receiving sections with a transport path of said bank notes sandwiched therebetween, forming said light projecting and receiving sections with a light guide plate for irradiating substantially the entire passing width of said bank notes over a slit area, an infrared light LED, a red light LED, a green light LED, and a blue light LED provided on a side of said light guide plate, and a photodiode array disposed in parallel with said light guide plate, and detecting information on the top and bottom of the same part of said bank notes passing through said transport path simultaneously with said pair of light projecting and receiving sections using reflected light; or disposing a light projecting section and a light projecting and receiving section with a transport path of said bank notes sandwiched therebetween, forming said light projecting section with a first light guide plate for irradiating over a slit area substantially the entire passing width of said bank notes and an ultraviolet light LED, an infrared light LED, and a first green light LED provided on a side of said first light guide plate, forming said light projecting and receiving section with a second light guide plate for irradiating over a slit area substantially the entire passing width of said bank notes, a red light LED, a second green light LED, and a blue light LED provided on a side of said second light guide plate, and a photodiode array disposed in parallel with said second light guide plate; and detecting information on the top and bottom of the same part of said bank notes passing through said transport path with said photodiode array using reflected light and transmitted light; or disposing a light projecting section and a light projecting and receiving section with a transport path of said bank notes sandwiched therebetween, forming said light projecting section with a first light guide plate for irradiating over a slit area substantially the entire passing width of said bank notes, an infrared light LED and a first green light LED provided on a side of said first light guide plate, and a first ultraviolet light LED array disposed in parallel with said first light guide plate, forming said light projecting and receiving section with a second light guide plate for irradiating over a slit area substantially the entire passing width of said bank notes, a red light LED, a second green light LED, and a blue light LED provided on a side of said second light guide plate, a second ultraviolet light LED array disposed in parallel with said second light guide plate, and a photodiode array disposed in parallel with said second light guide plate, and detecting information on the top and bottom of the same part of said bank notes passing through said transport path with said photodiode array using reflected light and transmitted light. A UV lamp or a barrier discharge fluorescent lamp may be used instead of said first ultraviolet light LED array and second ultraviolet light LED array.

Further, the above-described object is achieved by disposing a light projecting section and a light projecting and receiving section with a transport path of said bank notes sandwiched therebetween; forming said light projecting section with a first light guide plate for irradiating over a slit area substantially the entire passing width of said bank notes and an infrared light LED and a first green light LED provided on a side of said first light guide plate, forming said light projecting and receiving section with a second light guide plate for irradiating over a slit area substantially the entire passing width of said bank notes, a red light LED, a second green light LED, and a blue light LED provided on a side of said second light guide plate, and a photodiode array disposed in parallel with said second light guide plate, and detecting information on the top and bottom of the same part of said bank notes passing through said transport path with said photodiode array using reflected light and transmitted light.

A display section may be provided integrally with or separately from said bank note processing machine to irradiate said bank notes with ultraviolet light from said light projecting section or light projecting and receiving section, thereby displaying images of said bank notes on said display section based on fluorescent light that is visible light generated as a result of transmission or reflection of said ultraviolet light at least when said bank notes react to said ultraviolet light; images of said bank notes may be displayed on said display section based on reflected light or transmitted light of infrared light obtained by irradiating said bank notes with said infrared light from said light projecting section or light projecting and receiving section; and said accumulating section may be a single accumulating section.

DESCRIPTION OF THE PREFERRED EMBODIMENTS

According to the present invention, in constituting a discrimination sensor comprised of a light source having a plurality of wavelengths, a single LED is employed for each of the wavelengths, and each beam of light emitted by the single LED is guided from a side of a light guide plate. Light emitted from the light guide plate on a surface emission basis is radiated over a slit area substantially the entire passing width of a bank note, and light reflected and transmitted by the bank note is processed to perform a process of discriminating the bank note. Since a bank note is irradiated with light having a plurality of wavelengths using the light guide plate, the discrimination sensor can be formed in a compact size, and a bank note processing machine can be made compact by making a bank note transport path thereof short.

A mode for carrying out the present invention will now be described with reference to drawings.

Figure 1:
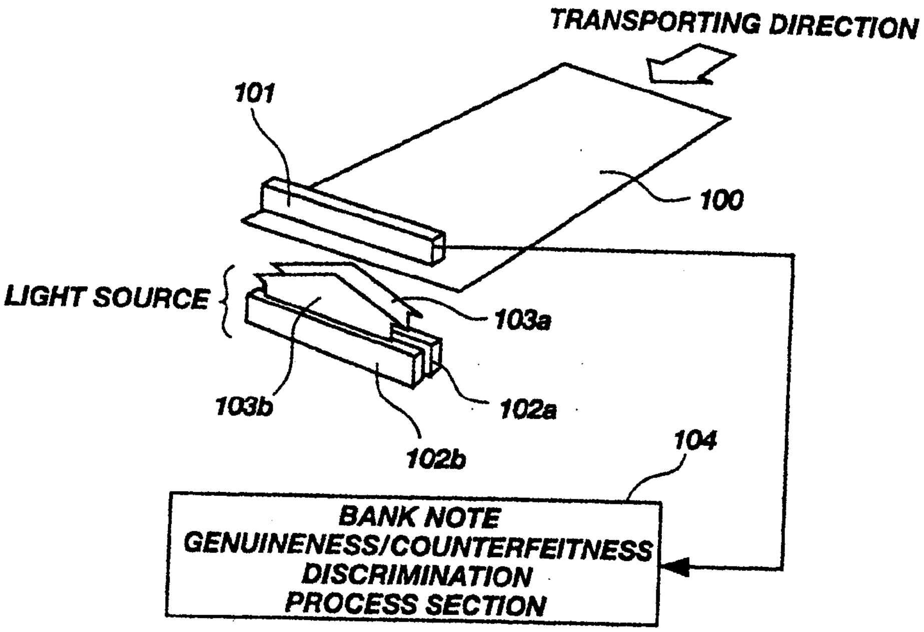
Fig. 1 (PRIOR ART)
FIG. 1 is a schematic configuration diagram showing an example of a conventional bank note processing machine.
Figure 2:
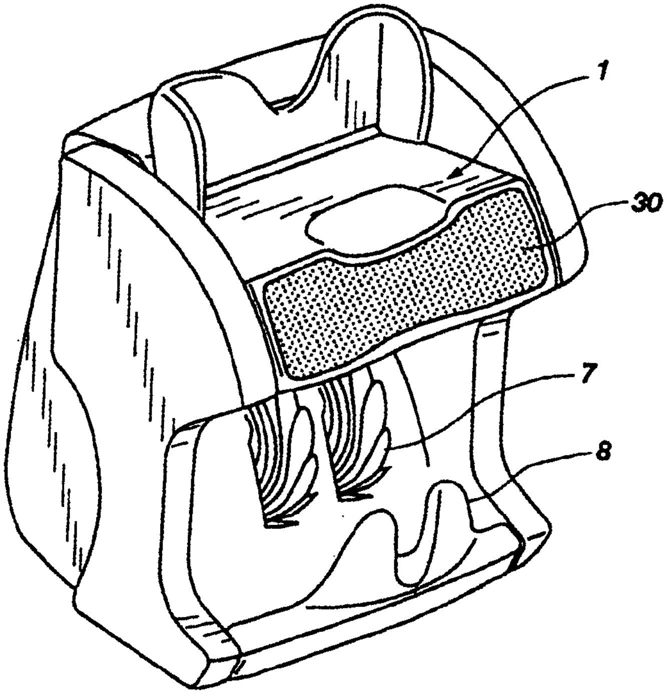
FIG. 2 is an external view of a bank note processing machine according to the present invention.
Figure 3:
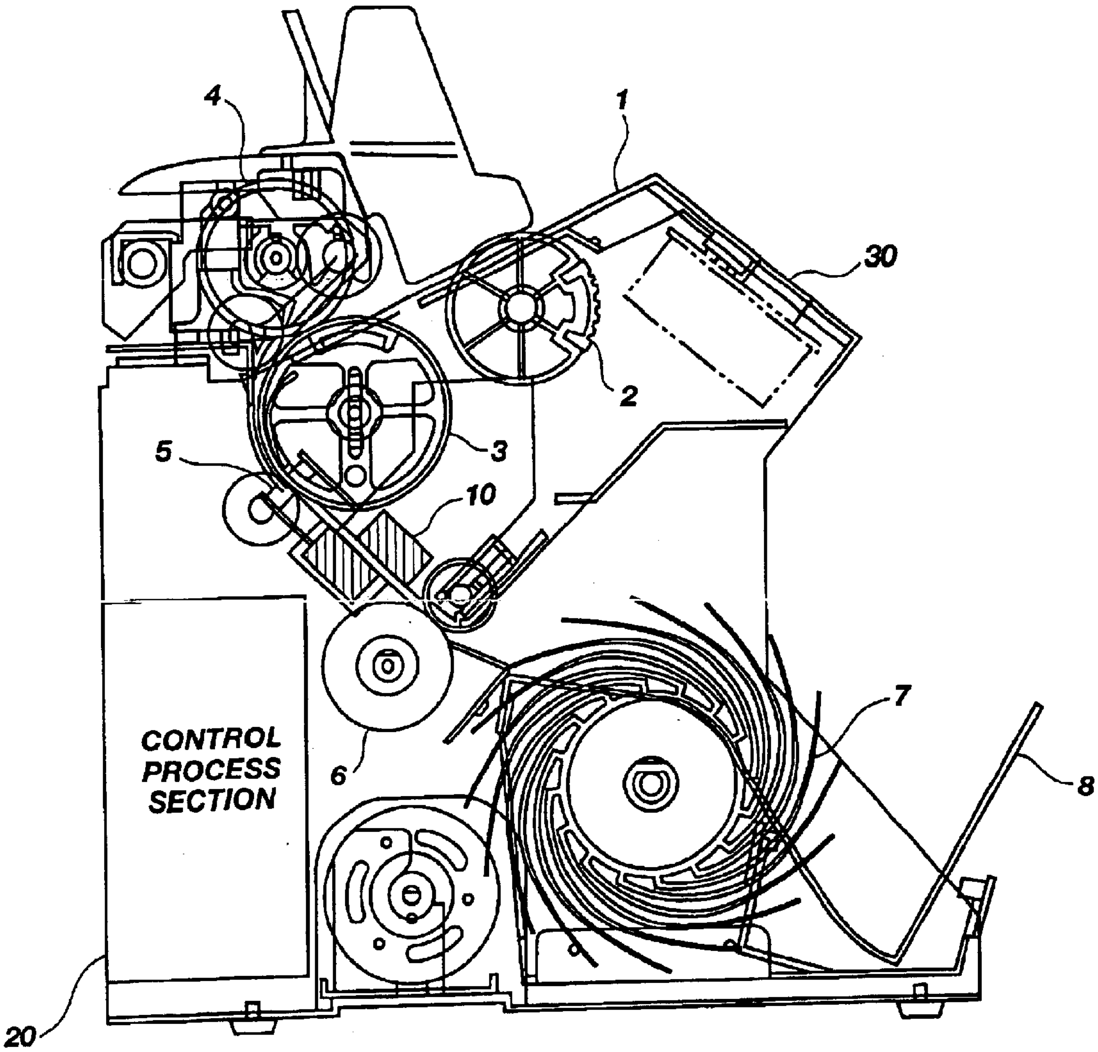
FIG. 3 is a cross-sectional structure diagram of the bank note processing machine according to the present invention.

FIG. 2 shows an external configuration of a bank note processing machine according to the present invention, and FIG. 3 shows a cross-sectional structure of the same. Bank notes placed on an insert tray 1 in an upper part thereof are delivered by a feed roller 2, and the delivered bank notes are introduced into a transport path by a transport roller 3 and are separated by a separating roller 4 disposed so as to press them in a face-to-face relationship to be fed into the transport path one by one. The bank notes fed into the transport path are forwarded to a delivery roller 6 via an overlapping feed check sensor 5 and a discrimination sensor 10 disposed at a discrimination sensor section and are further thrown out and accumulated in an accumulating section 8 through a vane wheel 7 formed by a multiplicity of vane materials. Further, a control process section 20 is incorporated which processes detection signals from the overlapping feed check sensor 5 and discrimination sensor 10 and which controls the machine as a whole, and there is a single accumulating section 8 in the configuration. Further, a display section 30 for displaying infrared light images is provided on the front face of the bank note processing machine.

Figure 4A:
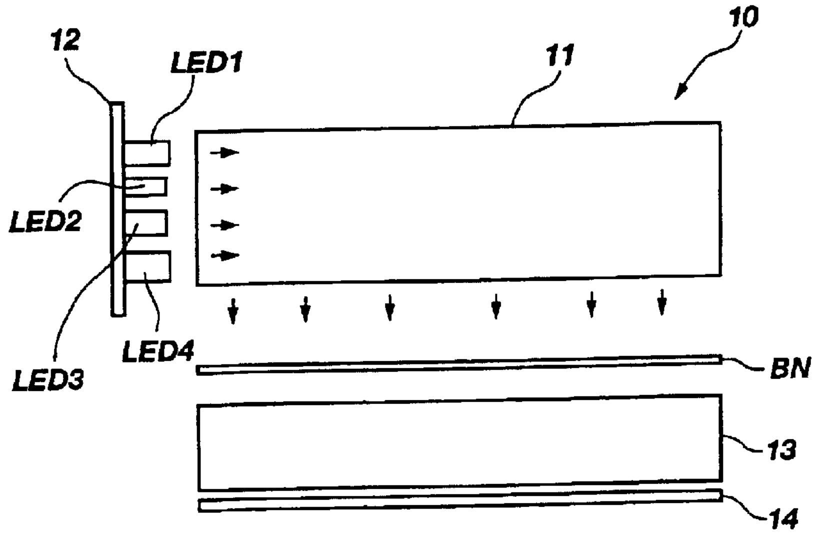
FIGS. 4A and 4B are side views showing an example of a configuration of a discrimination sensor used in the present invention.
Figure 4B:
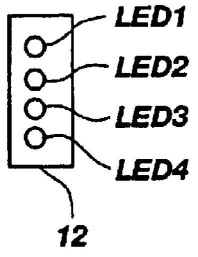
Figure 5A:
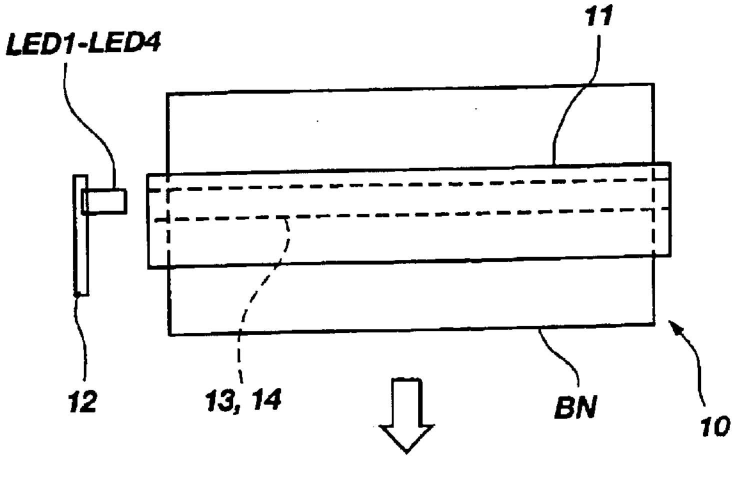
FIGS. 5A and 5B are plan views showing the example of a configuration of a discrimination sensor used in the present invention.
Figure 5B:
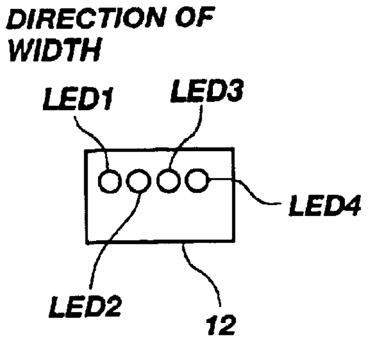

A configuration of the discrimination sensor 10 of the present invention will now be described with reference to the side view in FIGS. 4A and 4B, the plan view in FIGS. 5A and 5B and the perspective structure diagram in FIG. 6.

The present example shows a case in which a bank note BN is transported in the direction of the shorter dimension thereof and in which the bank note BN is discriminated by detecting light transmitted thereby. The discrimination sensor 10 is provided perpendicularly to the traveling direction of the bank note BN, and the scanning area of the discrimination sensor 10 has a length that covers the longitudinal dimension of the bank note BN. The discrimination sensor 10 is constituted by a light projecting section and a light receiving section located above and under the bank note BN sandwiched between them, and the light projecting section is constituted by a light guide plate 11 for radiating light over a slit area and LED 1-LED 4 mounted on a substrate 12 provided on a side of the light guide plate 11. The light receiving section is constituted by a cylindrical lens 13 for collecting light transmitted by the light guide plate 11 through the bank note BN and a photodiode array 14 for converting the same into an electrical signal in accordance with the quantity of the light collected by the cylindrical lens 13, and the positional relationship between the substrate 12 and the LED 1-LED 4 is as shown in FIG. 4A and FIG. 5A. In the present example, the LED 1, LED 2, LED 3 and LED 4 emit infrared light (IF), red light (R), green light (G), and blue light (B), respectively.

Figure 7A:
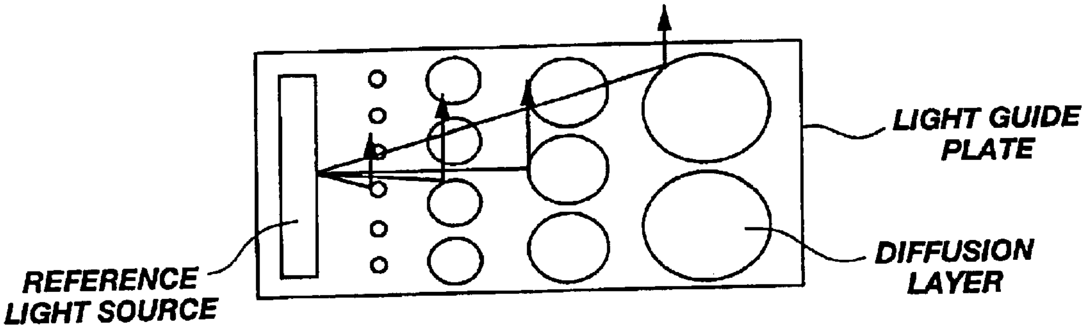
FIGS. 7A and 7B are a plan view and a sectional side elevation for explaining the principle behind the operation of a light guide plate.
Figure 7B:
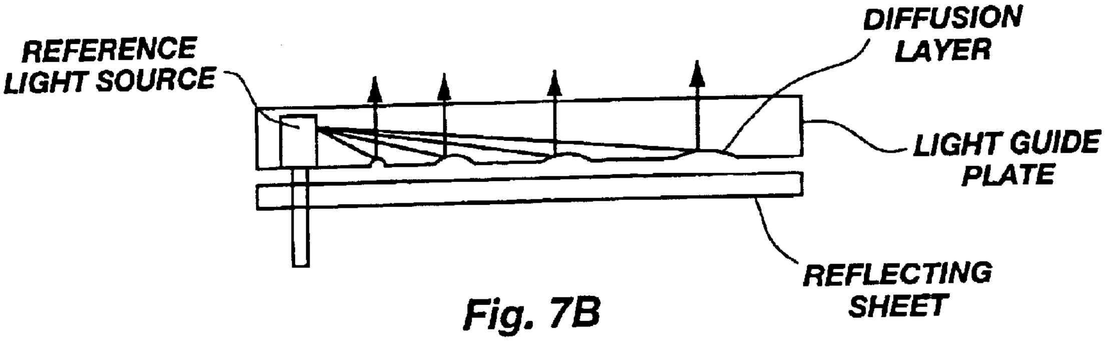

A principle of the operation of the light guide plate 11 will now be described with reference to FIGS. 7A and 7B. A reflecting sheet is provided on one surface of the light guide plate and, when LED light emitted by a reference light source enters the light guide plate from an end face thereof, it is uniformly surface-emitted from a surface of the light guide plate. The light guide plate is a well-known part and, for example, "LUB1000" manufactured by ROHM Co., LTD. (in Japan) or "RAYDAC ROD" manufactured by Bridgestone Corporation (in Japan) may be used. The light guide plate is basically similar to an optical fiber in structure and is formed by a core material and a clad material, and total reflection occurs at an interface between the core material and clad material to form an optical reflection layer between the core material and clad material, thereby emitting intense light having high directivity from a surface of the rod.

In such a configuration, a plurality of unprocessed bank notes are placed on the insert tray 1 and are sequentially delivered by the delivery roller 2 one by one starting with the lowermost bank note upon an instruction for a discriminating operation that is made manually or automatically, the delivered bank note being passed to the transport roller 3. The separating roller 4 is provided in a face-to-face relationship with the transport roller 3 with a gap smaller than two sheets of bank notes left between them. Therefore, when the bank notes are delivered in company (two sheets are delivered) due to friction between the bank notes or the like, the separating roller 4 prevents them from entering the gap. Even when the bank notes delivered as a pair enter the transport path because of variation of the thickness of the bank notes or the like, transportation is stopped by detecting them with the optical overlapping feed check sensor 5 to make it possible to eliminate such bank notes delivered as a pair. When a normally transported bank note passes through the discrimination sensor 10 provided in the transport path, the entire surface of the bank note is optically scanned in the direction of the length of the transportation to discriminate the bank note type and the genuineness/falsehood of the same at the control process section 20.

Figure 8:
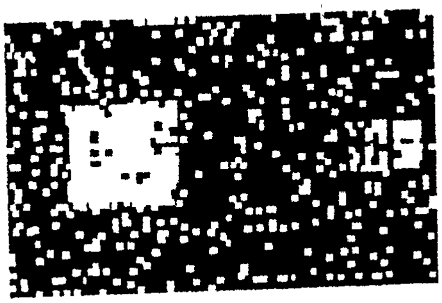
FIG. 8 is an illustration showing an example of an image of a bank note associated with infrared light.

The LED 1, LED 2, LED 3 and LED 4 of the discrimination sensor 10 sequentially emit infrared light (IF), red light (R), green light (G) and blue light (B) respectively in a predetermined cycle, and those optical signals in a plurality of wavelengths are inputted to and processed by the control process section 20 to determine the type and the genuineness/falsehood of the bank note BN based on the signals associated with the wavelengths. An image associated with infrared light that is invisible is displayed on the display section 30 as shown in FIG. 8 for convenience in discriminating the bank note.

The bank notes BN that have thus passed through the discrimination sensor 10 travel through the delivery roller 6 located downstream thereof to the vane wheel 7 to be sandwiched by the vanes thereof and to be accumulated in the accumulating section 8 in order. Thus, the bank notes BN placed on the insert tray 1 are sequentially processed.

Figure 9:
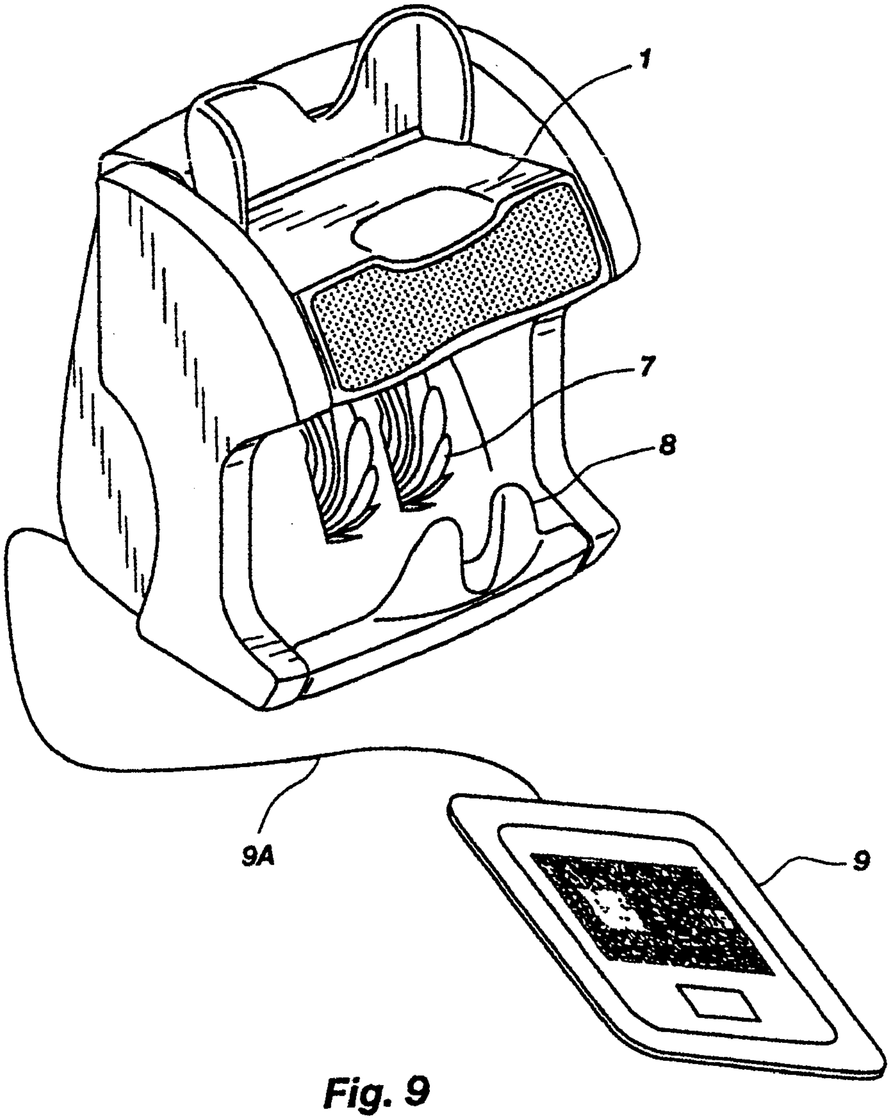
FIG. 9 is an external view of another example of a bank note processing machine according to the present invention.

While an image of infrared light is displayed by the display section 30 that is integral with the bank note processing machine in the above description, it may alternatively be displayed on a separate display device 9 through a line 9A as shown in FIG. 9. While an image of a bank note that is associated with infrared light is displayed in the above description, an ultraviolet light image of a bank note may alternatively be displayed.

Figure 10:
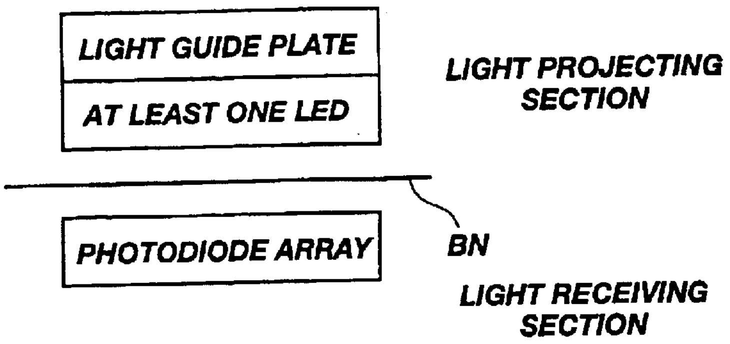
FIG. 10 is a schematic structure diagram showing another example (transmission type with one wavelength) of a discrimination sensor used in the present invention.
Figure 11:
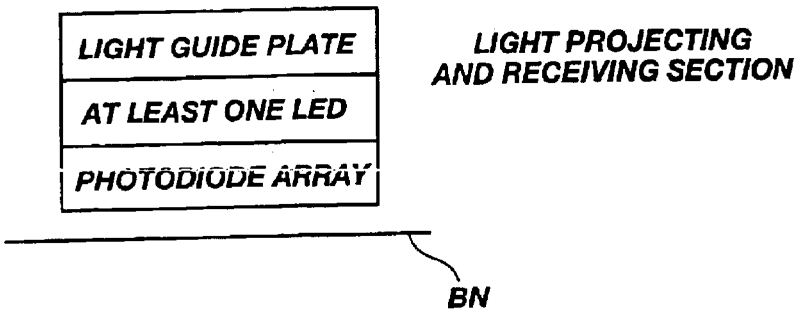
FIG. 11 is a schematic structure diagram showing another example (reflection type with one wavelength) of a discrimination sensor used in the present invention.
Figure 12:
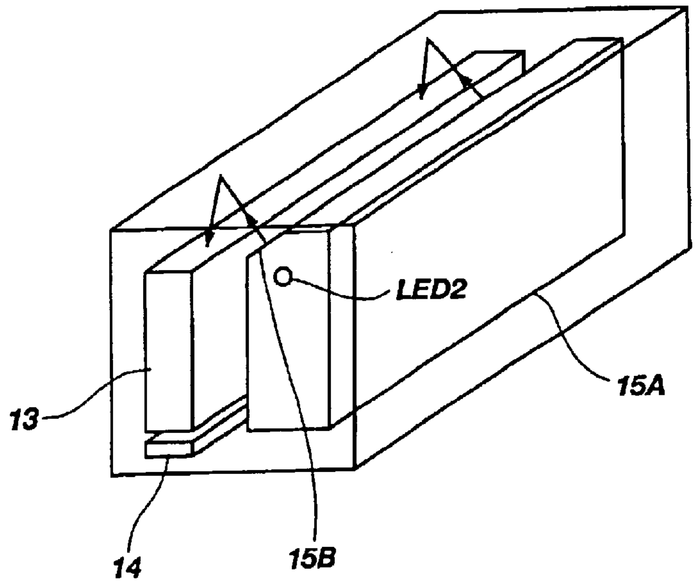
FIG. 12 is a perspective structure diagram of FIG. 11.

Further, while the wavelengths used by the discrimination sensor 10 are four types, i.e., infrared light, red light, green light and blue light in the above description, according to the principle, an alternative configuration may be employed in which the light projecting section is formed using a single LED (any of infrared light, red light, green light, blue light and ultraviolet light (UV)) as the irradiating light source, light from which is received by the photodiode at the light receiving section, as shown in FIG. 10. When light reflected by a bank note BN is to be received, a light projecting and receiving section may be employed which is obtained by integrating a light projecting section and a light receiving section, as shown in FIG. 11 and FIG. 12. Specifically, an inclined cut surface 15B is formed at an upper corner of a light guide plate 15A, and an LED 2 is disposed on a side of the light guide plate 15A to radiate red light from the cut surface 15B. The red light radiated from the cut surface 15B is reflected by the bank note BN, and the reflected light is received by a photodiode array 14 provided in parallel with the light guide plate 15A through a cylindrical lens 13.

Figure 13:
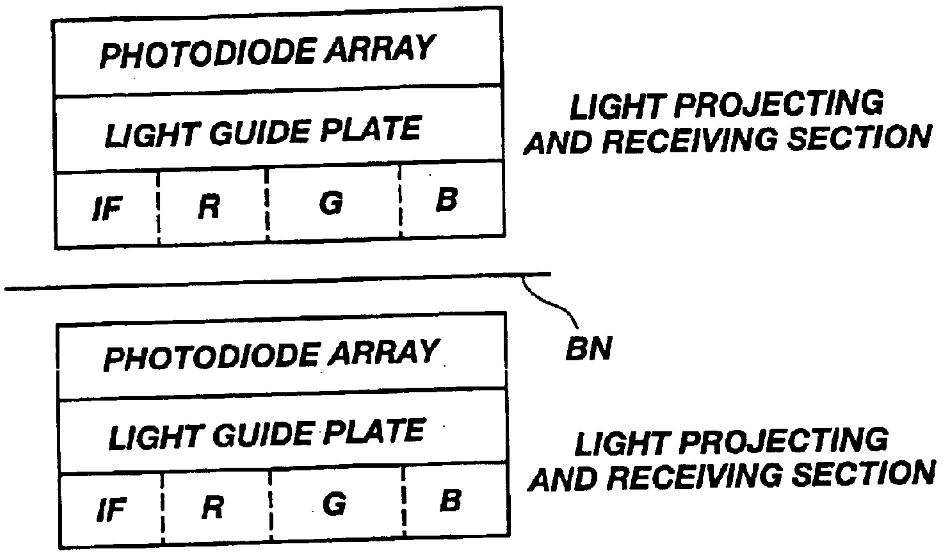
FIG. 13 is a schematic structure diagram showing another example (reflection type with four wavelengths) of a discrimination sensor used in the present invention.
Figure 14:
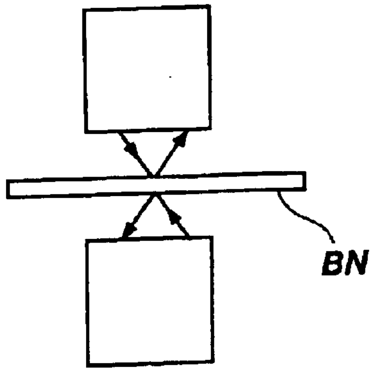
FIG. 14 is an illustration showing how to discriminate a bank note utilizing reflection on both sides thereof.

FIG. 13 shows a sensor configuration in which two identical light projecting and receiving sections are used to detect information on the top and bottom of the same part of the bank note BN using reflected light as shown in FIG. 14. The upper light projecting and receiving section and lower light projecting and receiving section have the same configuration in which an inclined cut surface 11B is formed at an upper corner of a light guide plate 11A and in which LED 1-LED 4 are disposed on a side of the light guide plate 11A to sequentially radiate beams of light in four wavelengths from the cut surface 11B. The beams of light in four wavelengths radiated from the cut surface 11B are reflected by the bank note BN, and the reflected beams of light are received by a photodiode array 14 disposed in parallel with the light guide plate 11A through a cylindrical lens 13.

Figure 6:
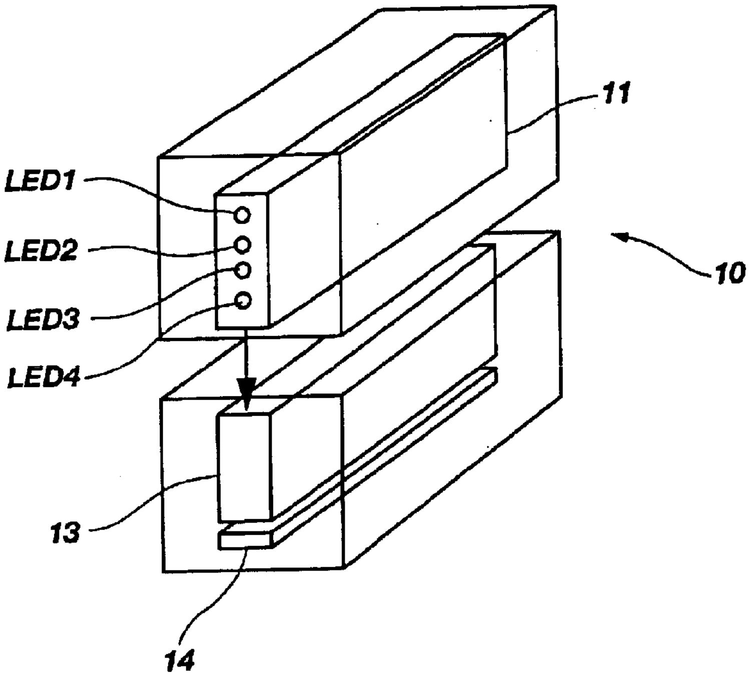
FIG. 6 is a perspective structure diagram showing the example of a configuration of a discrimination sensor used in the present invention.
Figure 15:
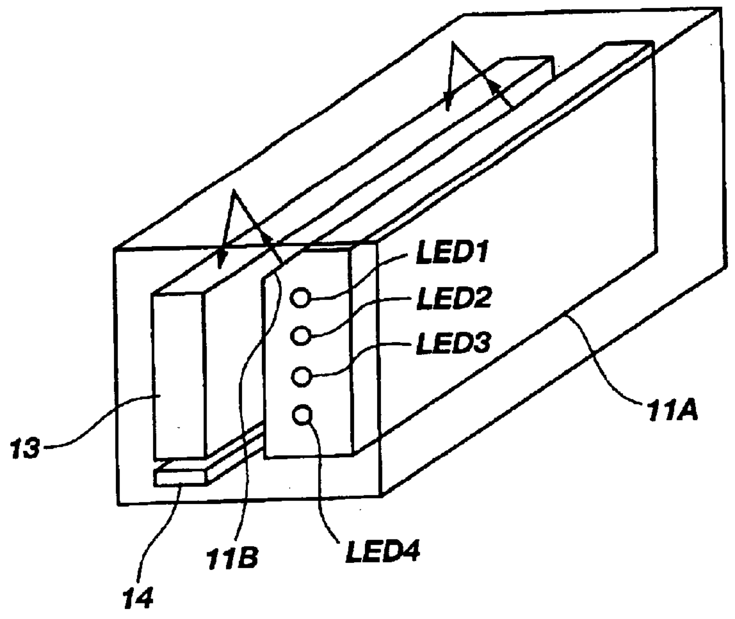
FIG. 15 is a perspective structure diagram showing one side of FIG. 13.
Figure 16:
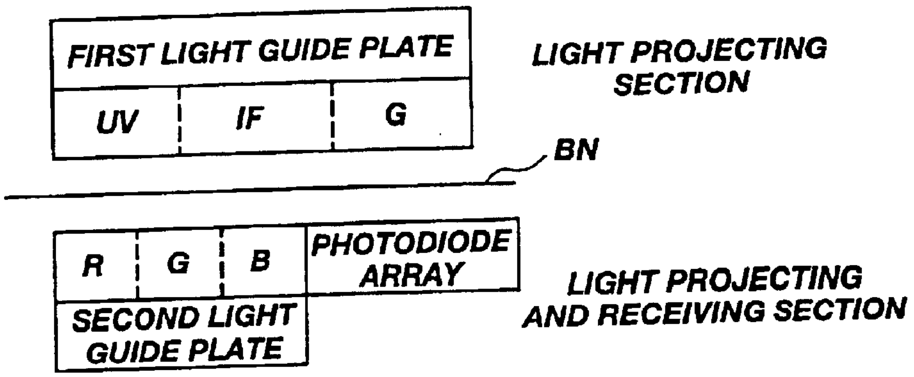
FIG. 16 is a schematic structure diagram showing another example (a reflection type and a transmission type each having three wavelengths) of a discrimination sensor used in the present invention.
Figure 17:
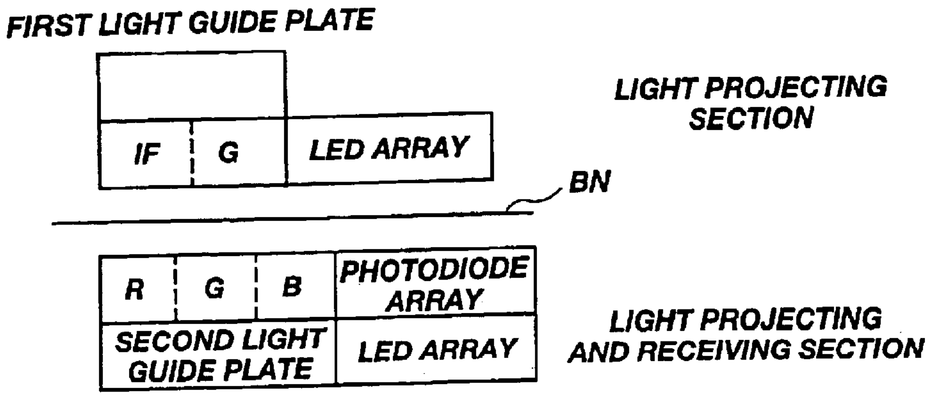
FIG. 17 is a schematic structure diagram showing another example (a reflection type with four wavelengths and a transmission type with three wavelengths) of a discrimination sensor used in the present invention.
Figure 18:
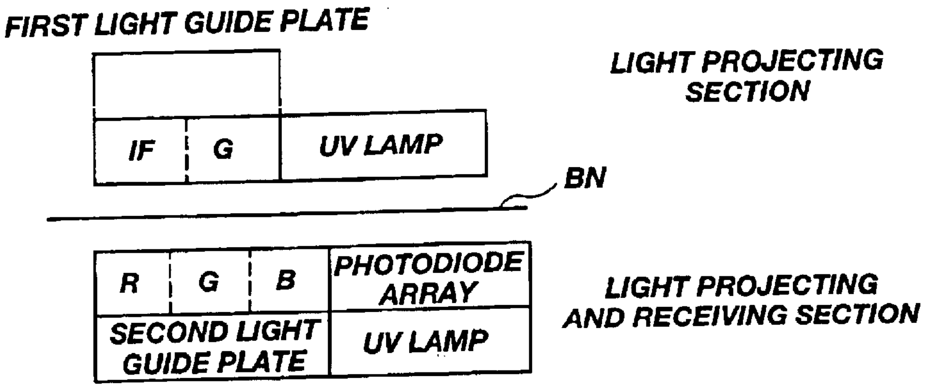
FIG. 18 is a schematic structure diagram showing another example (a reflection type with four wavelengths and a transmission type with three wavelengths) of a discrimination sensor used in the present invention.
Figure 19:
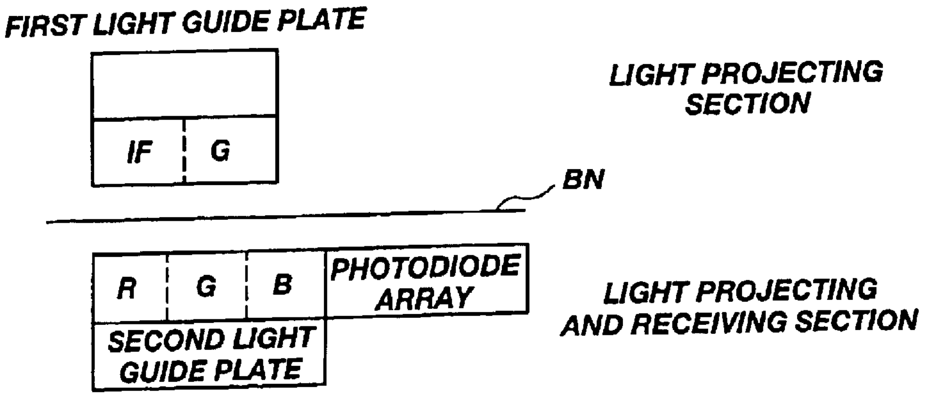
FIG. 19 is a schematic structure diagram showing another example (a reflection type with three wavelengths and a transmission type with two wavelengths) of a discrimination sensor used in the present invention.

Each of discrimination sensors in FIGS. 16 through 19 schematically represents an example of a combination of the above-described transmission type discrimination sensor shown in FIG. 6 and the reflection type discrimination sensor shown in FIG. 15, and the discrimination sensor in FIG. 16 is an example in which a light projecting section that is located higher is formed by ultraviolet light (UV), infrared light and green light LEDs and a light guide plate and in which a light projecting and receiving section that is located lower is formed by red light, green light and blue light LEDs, a photodiode array and a light guide plate. The photodiode array is provided in parallel with the light guide plate in the vicinity of the same. The discrimination sensor in FIG. 17 is an example in which a light projecting section that is located higher is formed by red light, green light and ultraviolet light LEDs and a light guide plate and in which a light projecting and receiving section that is located lower is formed by red light, green light, blue light and ultraviolet light LEDs, a photodiode array and a light guide plate. The photodiode array is provided in parallel with the light guide plate in the vicinity of the same. Further, the discrimination sensor in FIG. 18 is an example in which a light projecting section that is located higher is formed by the infrared light and green light LEDs, a UV (ultraviolet light) lamp and a light guide plate and in which a light projecting and receiving section that is located lower is formed by the red light, green light and blue light LEDs, a UV lamp, a photodiode array and a light guide plate. Each of the UV lamp and the photodiode array is provided in parallel with the light guide plate in the vicinity of the same. The discrimination sensor in FIG. 19 is an example in which a light projecting section that is located higher is formed by the red light and green light LEDs and a light guide plate and in which a light projecting and receiving section that is located lower is formed by red light, green light and blue light LEDs, a photodiode array and a light guide plate. The photodiode array is provided in parallel with the light guide plate in the vicinity of the same.

In the context of the present invention, the band of ultraviolet light (UV) is a wavelength of approximately 370 nanometers; the band of infrared light (IF) is a wavelength of approximately 800 to 1000 nanometers; the band of red light (R) is a wavelength of approximately 630 nanometers; the band of green light (G) is a wavelength of approximately 520 nanometers; and the band of blue light (B) is a wavelength of approximately 465 nanometers. The timing for turning on each of the individual LEDs, the ultraviolet LED array, the UV lamp, and the barrier discharge fluorescent lamp may be the same timing to generate light of a mixed color, or time differences may be provided to achieve the so-called alternating turning on, thereby radiating each monochromatic light separately.

Furthermore, while individual LEDs having respective wavelengths are normally provided in the direction of the thickness of the light guide plate (the direction of becoming apart from the bank note transport path), this is not limiting the invention, and the LEDs may be provided in the direction of the width of the light guide plate depending on the characteristics of the light guide plate to be used.

As thus described, in a bank note processing machine according to the present invention, one or more LEDs and a light guide plate are combined to provide a source of light over a slit area, which is advantageous in that there is no increase in the dimensions occupied in a bank note transport direction attributable to an increase in the number of the loaded LEDs, if any. Even when individual LEDs are provided for four wavelengths (infrared, red, green and blue), the dimensions occupied in the bank note transport direction can be small, and such a configuration is for detecting light having four wavelengths transmitted by bank notes and is preferable for use in a circuit for processing transmitted light. When alight projecting and receiving section is provided by adding a photodiode array to LEDs with four wavelengths, although it occupies greater dimensions because of the photodiode array disposed in parallel, there is an advantage in that identical parts can be provided in upper and lower sections to allow parts communization and in that it is preferable for use in a circuit for processing light reflected by each of top and bottom of bank notes.

When a source for light over a slit area is formed as a light projecting section by using individual LEDs for three wavelengths (ultraviolet, infrared and green) and combining them with a light guide plate and a light projecting and receiving section is formed at the light receiving end by using individual LEDs for three wavelength (red, green and blue), combining them with a light guide plate to form a source of light over a slit area and adding a photodiode array, although the dimensions occupied in the bank note transport direction is increased because of the photodiode array disposed in parallel, it is preferable for use in a circuit for discriminating genuineness/falsehood from transmitted light that is ultraviolet light, infrared light and green light and for discriminating bank note types and the like from reflected light that is red light, green light and blue light.

An ultraviolet light LED array as a light source for reflection may be added as a solution to a case wherein the luminance of the single ultraviolet light LED is insufficient, and a UV lamp as a light source for reflection may be added as another solution to the case wherein the luminance of the single ultraviolet LED is insufficient. The ultraviolet light LED for determining genuineness/falsehood may be omitted to provide a simpler configuration.

Further, when bank notes reacting to ultraviolet light are irradiated with ultraviolet light to display images of the bank notes on a display section based on the same, an operator may check questionable bank notes with the naked eyes. The same effect can be achieved by using infrared light instead of ultraviolet light, and the dimensions of the apparatus can be further reduced when a single accumulating section is used because the single accumulation section is used.

It should be understood that many modifications and adaptations of the invention will become apparent to those skilled in the art and it is intended to encompass such obvious modifications and changes in the scope of the claims appended hereto.

What is claimed is:

1. A bank note processing machine in which bank notes placed on an insert tray are sequentially delivered one by one to a discrimination sensor section; the bank note types and the genuineness/falsehood of said bank notes being discriminated based on signals detected by a discrimination sensor at said discrimination sensor section; and said discriminated bank notes being subsequently sent to an accumulating section, said bank note processing machine comprising said discrimination sensor being formed by a light projecting section for irradiating through a slit area substantially over the entire passing width of said bank notes and a light receiving section constituted by a photodiode array; said light projecting section being formed by a light guide plate and at least one LED provided on an end face of said light guide plate; light from said LED being inputted to said light guide plate and an advance direction of entered light being changed into a perpendicular direction to a light axis of said light guide plate; light being uniformly emitted from a whole surface of said light guide plate irrespective of a distance from said LED; and said light projecting section and light receiving section being provided in a face-to-face relationship with a transport path of said bank notes sandwiched therebetween or provided in parallel on one side of said transport path.

2. A bank note processing machine according to claim 1, wherein said LED is an ultraviolet light, infrared light, red light, green light or blue light LED.

3. A bank note processing machine according to claim 2, wherein a display section is provided integrally with or separately from said bank note processing machine to display said bank notes with ultraviolet light irradiated from said light projecting section, thereby displaying images of said bank notes on said display section based on fluorescent light that is visible light generated as a result of transmission or reflection of said ultraviolet light at least when said bank notes react to said ultraviolet light.

4. A bank note processing machine according to claim 2, wherein a display section is provided integrally with or separately from said bank note processing machine to display images of said bank notes on said display section based on reflected light or transmitted light of infrared light obtained by irradiating said bank notes with said infrared light from said light projecting section.

5. A bank note processing machine according to claim 1, wherein said accumulating section is a single accumulating section.

6. A bank note processing machine in which bank notes placed on an insert tray are sequentially delivered one by one to a discrimination sensor section; the bank note types and the genuineness/falsehood of said bank notes being discriminated based on signals detected by a discrimination sensor at said discrimination sensor section; and said discriminated bank notes being subsequently sent to an accumulating section, said bank note processing machine comprising said discrimination sensor being formed by a light projecting section for irradiating through a slit area substantially over the entire passing width of said bank notes and a light receiving section constituted by a photodiode array; said light projecting section being formed by a light guide plate and an infrared light LED, a red light LED, a green light LED and a blue light LED provided on an end face of said light guide plate; lights from said respective LEDs being inputted to said light guide plate and respective advance directions of entered lights being changed into perpendicular directions to a light axis of said light guide plate; light being uniformly emitted from a whole surface of said light guide plate irrespective of distances from said respective LEDs; and said light projecting section and light receiving section being provided in a face-to-face relationship with a transport path of said bank notes sandwiched therebetween.

7. A bank note processing machine according to claim 6, wherein a display section is provided integrally with or separately from said bank note processing machine to display images of said bank notes on said display section based on reflected light or transmitted light of infrared light obtained by irradiating said bank notes with said infrared light from said light projecting section.

8. A bank note processing machine according to claim 6, wherein said accumulating section is a single accumulating section.

9. A bank note processing machine in which bank notes placed on an insert tray are sequentially delivered one by one to a discrimination sensor section; the bank note types and the genuineness/falsehood of said bank notes being discriminated based on signals detected by a discrimination sensor at said discrimination sensor section; and said discriminated bank notes being subsequently sent to an accumulating section, said bank note processing machine comprising a pair of light projecting and receiving sections being disposed on a transport path of said bank notes and sandwiched therebetween; said light projecting and receiving sections being formed by a light guide plate to uniformly emit light from a whole surface for irradiating through a slit area substantially over the entire passing width of said bank notes, an infrared light LED, a red light LED, a green light LED and a blue light LED provided on an end face of said light guide plate, and a photodiode array disposed in parallel with said light guide plate; lights from said respective LEDs being inputted to said light guide plate and respective advance directions of entered lights being changed into perpendicular directions to a light axis of said light guide plate; and information on the top and bottom of the same part of said bank notes passing through said transport path being simultaneously detected by said pair of light projecting and receiving sections using reflected light.

10. A bank note processing machine according to claim 9, wherein corners of said light guide plate are cut surfaces and wherein light from the infrared light LED, red light LED, green light LED and blue light LED is radiated from said cut surfaces.

11. A bank note processing machine according to claim 10, wherein a display section is provided integrally with or separately from said bank note processing machine to display images of said bank notes on said display section based on reflected light or transmitted light of infrared light obtained by irradiating said bank notes with said infrared light from said light projecting section or light projecting and receiving section.

12. A bank note processing machine according to claim 9, wherein a display section is provided integrally with or separately from said bank note processing machine to display images of said bank notes on said display section based on reflected light or transmitted light of infrared light obtained by irradiating said bank notes with said infrared light from said light projecting section or light projecting and receiving section.

13. A bank note processing machine in which bank notes placed on an insert tray are sequentially delivered one by one to a discrimination sensor section; the bank note types and the genuineness/falsehood of said bank notes being discriminated based on signals detected by a discrimination sensor at said discrimination sensor section; and said discriminated bank notes being subsequently sent to an accumulating section, said bank note processing machine comprising said discrimination sensor being formed by a light projecting section for irradiating through a slit area substantially over the entire passing width of said bank notes and a light receiving section constituted by a photodiode array; said light projecting section being formed by a light guide plate and two LEDs provided on an end face of said light guide plate; lights from said LEDs being inputted to said light guide plate and respective advance directions of entered lights being changed into perpendicular directions to a light axis of said light guide plate; light being uniformly emitted from a whole surface of said light guide plate irrespective of a distance from said LEDs; and said light projecting section and light receiving section being provided in a face-to-face relationship with a transport path of said bank notes sandwiched therebetween or provided in parallel on one side of said transport path.

14. A bank note processing machine according to claim 13 wherein said two LEDs are an infrared light LED and a visible light LED.

* * * * *